US008542226B2

(12) United States Patent
Li et al.

(10) Patent No.: US 8,542,226 B2
(45) Date of Patent: Sep. 24, 2013

(54) GATE PULSE MODULATING CIRCUIT AND METHOD

(75) Inventors: Jian-Feng Li, Hsin-Chu (TW); Chao-Ching Hsu, Hsin-Chu (TW); Jen-Chieh Chen, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 256 days.

(21) Appl. No.: 13/112,573

(22) Filed: May 20, 2011

(65) Prior Publication Data

US 2012/0038610 A1 Feb. 16, 2012

(30) Foreign Application Priority Data

Aug. 13, 2010 (TW) ................................ 99127203 A

(51) Int. Cl.
*G06F 3/038* (2013.01)

(52) U.S. Cl.
USPC ................................ 345/211; 345/94; 345/99

(58) Field of Classification Search
None
See application file for complete search history.

(56) References Cited

U.S. PATENT DOCUMENTS

| | | | | |
|---|---|---|---|---|
| 6,903,715 | B2 | 6/2005 | Song | |
| 7,002,542 | B2 | 2/2006 | Lee | |
| 7,486,268 | B2 | 2/2009 | Jang et al. | |
| 7,586,477 | B2 | 9/2009 | Lee | |
| 7,924,255 | B2 * | 4/2011 | Hsu et al. | 345/94 |
| 8,154,500 | B2 * | 4/2012 | Kim | 345/100 |
| 2010/0245333 | A1 | 9/2010 | Hsu et al. | |

FOREIGN PATENT DOCUMENTS

| | | |
|---|---|---|
| CN | 101520998 | 9/2009 |

* cited by examiner

*Primary Examiner* — Jason Olson
(74) *Attorney, Agent, or Firm* — WPAT, PC; Justin King

(57) ABSTRACT

A gate pulse modulating circuit includes a timing controller capable of generating an output enable signal and a plurality of timing control signals; a high gate voltage generating unit, electrically connected to the timing controller for receiving the timing control signals, capable of generating a high gate voltage with a waveform including a plurality of cutting edges in response to the timing control signals; a low gate voltage generating unit capable of generating a low gate voltage; and a gate driver, electrically connected to the timing controller for receiving the output enable signal and the high gate voltage generating unit for receiving the high gate voltage and the low gate voltage generating unit for receiving the low gate voltage, capable of generating a plurality of gate pulses in response to a plurality of enable periods of the output enable signal; wherein a waveform of the gate pulses includes a plurality of cutting edges.

11 Claims, 11 Drawing Sheets

GATE PULSE MODULATING CIRCUIT AND METHOD

FIELD OF THE INVENTION

The present invention relates to a gate pulse modulating circuit and associated modulating method, and more particularly to a gate pulse modulating circuit and modulating method, capable of generating a high gate voltage (VGH) with a waveform including a plurality of cutting edges and a gate pulse with a waveform including a plurality of cutting edges.

BACKGROUND OF THE INVENTION

Please referring to FIG. 1, it is a drawing schematically showing a pixel cell of a thin film transistor of a LCD panel (hereinafter referred to as LCD) in accordance with an existing technology. The pixel cell 100 comprises a switching transistor Qd, a liquid crystal capacitor Clc, and a storage capacitor Cs. Furthermore, the gate of the switching transistor Qd is connected to the gate line Gn, the drain of the switching transistor Qd is connected to the source line Sn, and the storage capacitor Cs and the liquid crystal capacitor are connected the source of the switching transistor Qd.

As is well known, the gate line Gn of the LCD is connected to a gate driver. When the gate driver generates a gate pulse (gate pulse), the switching transistor Qd will be opened and the source driver can input the corresponding video voltage through the source line Sn to the pixel cell 100. Furthermore, the high voltage in the gate pulse of the gate driver can be used to turn on the switching transistor Qd, wherein the high voltage is called as a high gate voltage (VGH); while the low voltage in the gate pulse of the gate driver can be used to turn off the switching transistors Qd, wherein the low voltage is called as a low gate voltage (VGL).

Generally speaking, when the switching transistor Qd is turned off, a feed-through phenomenon would be generated due to a voltage Vgs on a parasitic capacitance Cgs between the gate and the source of the switching transistor. While, the high gate voltage (VGL) is critical to determine whether the feed-through phenomenon is serious, and when the feed-through phenomenon is lighter, flicker on the LCD panel would also be reduced.

Furthermore, the higher the high gate voltage (VGH) is, the faster the speed of the video voltage on the source line Sn 100 charging the pixel cell 100 would, but the more serious the feed-through phenomenon would be. Therefore, in order to take into account both of the charging efficiency of the video voltage and the feed-through phenomenon, output pulse of the current gate driver would be processed on the high gate voltage (VGH), resulting in a gate pulse with cutting edge waveform. In other words, the gate pulse with cutting edge waveform is generated by means of reducing the high level voltage before a falling edge of the gate pulse, to thereby reduce a voltage drop of the gate pulse at the falling edge and reduce feed-through phenomenon.

Please refer to FIG. 2A and FIG. 2B, they are diagrams showing a variation of gate driving voltage on the gate line. What as shown in FIG. 2A is a gate pulse (VGn) having its waveform without cutting edge. That is, at the moment the transistor Qd is turned off, the voltage Vgs (Va1-Va2) on the parasitic capacitance Cgs is great, thus resulting in a large feed-through phenomenon. What as shown in FIG. 2B is a gate pulse (VGn) with a waveform including a cutting edge. That is, at the moment the transistor Qd is turned off, the voltage (Vb1-Vb2) on the parasitic capacitance Cgs is smaller, thus reducing the feed-through phenomenon. In other words, early drop of the high gate voltage (VGH) can make the gate pulse waveform including cutting edge and allow the parasitic capacitance Vgs to slowly decrease the voltage during a time period t, and the longer the time period t lasts for, the lower the feed-through phenomenon is.

Please referring to FIG. 3A and FIG. 3B, they are diagrams showing gate pulse modulating circuit and associated signals thereof, in accordance with an existing technology. A gate pulse modulating circuit 300 comprises a timing controller 310, a high gate voltage generating unit 320, a low gate voltage generating unit 330, and a gate driver 340.

In order to achieve a high gate voltage (VGH) with a waveform including a cutting edge, the timing controller 310 outputs a time control signal T1 to the high gate voltage generating unit 320, enabling the high gate voltage generating unit 320 to output a high gate voltage (VGH). Furthermore, the low gate voltage generating unit 330 outputs a low gate voltage (VGL). The gate driver 340 receives the output enable signal (OE) from the timing controller 310, the high gate voltage (VGH), and the low gate voltage (VGL), and generates multiple gate pulses (G1~Gn) to the corresponding gate lines.

As shown in FIG. 3, the high gate voltage (VGH) outputted by the high gate voltage generating unit 320 is controlled by the timing controller 310 and thereby begins to drop from 23V at a particular time point. The low gate voltage (VGL) outputted from the low gate voltage generating unit 320 would be maintained steadily at −10V. Of course, the above-mentioned parameters, such as 23V of the high gate voltage (VGH) and −10V of the low gate voltage (VGL) are just examples, and not limited to the actual voltage values of the high gate voltage (VGH) and the low gate voltage (VGL).

Furthermore, the output enable signal (OE) outputted from the timing controller 310 is used to control the gate driver 340 to generate the gate pulses. As shown in FIG. 3B, in the first time period of high level of the output enable signal (OE), the high gate voltage (VGH) outputted from the high gate voltage generating unit 320 is converted by the gate driver 340 to a first gate pulse (G1) on the first gate line; while at the rest of the time a low gate voltage (VGL) is maintained on the first gate line. Similarly, in the second time period of high level of the output enable signal (OE), the high gate voltage (VGH) outputted from the high gate voltage generating unit 320 is converted by the gate driver 340 to a second gate pulse (G2) on the second gate line; while at the rest of the time a low gate voltage (VGL) is maintained on the second gate line. In the third time period of high level of the output enable signal (OE), the high gate voltage (VGH) outputted from the high gate voltage generating unit 320 is converted by the gate driver 340 to a third gate pulse (G3) on the third gate line; while at the rest of the time a low gate voltage (VGL) is maintained on the third gate line. In the fourth time period of high level of the output enable signal (OE), the high gate voltage (VGH) outputted from the high gate voltage generating unit 320 is converted by the gate driver 340 to a fourth gate pulse (G4) on the fourth gate line; while at the rest of the time a low gate voltage (VGL) is maintained on the fourth gate line. And so on produce multiple gate pulses.

Obviously, the time control signal T1 generated by the timing controller 310 is used to control the high gate voltage generating unit 320, enabling the high gate voltage generating unit 320 to generate the high gate voltage (VGH) in response to the time control signal, and thereby enabling the gate driver 340 to output the gate pulses (G1—Gn) with a waveform including a cutting edge.

Please refer to FIG. 4A and FIG. 4B, they are diagrams showing a high gate voltage generating unit and signals of a gate pulse modulating circuit, in accordance with an existing technology. The high gate voltage generating unit 320 comprises an inverter INV, a P-type transistor Q1, an N-type transistor Q2, a resistor Radj, and a capacitor Cg. Among them, the input of the inverter INV receives the time control signal T1, and the output of the inverter INV is connected to the gates of the P-type transistor Q1 and the N-type transistor Q2. The source of the P-type transistor Q1 is connected to a power source terminal Vcc, the drain of the P-type transistor Q1 is connected to the drain of the N-type transistor Q2 drain, and the a resistor Radj is connected between the source of the N-type transistor Q2 source and the ground. The capacitor Cg is connected between the drain of the P-type transistor Q1 and the ground, and the drain of the P-type transistor Q1 drain can produce the high gate voltage (VGH).

Known from the time control signal T1 and the high gate voltage (VGH) in FIG. 4B, at the time point t2 the time control signal T1 is at a low level, the N-type transistor Q2 is turned on and the P-type transistor Q1 is turned off, the N-type transistor Q2 and the resistor Radj generate a discharging path. Therefore, the voltage on the capacitor Cg drops from the Vcc, that is, the high gate voltage (VGH) drops. At the time point t4, the time control signal T1 is at a high level, the N-type transistor Q2 is turned off and the P-type transistor Q1 is turned on, the P-type transistor Q2 generates a charging path. Therefore, the voltage on the capacitor Cg is charged to Vcc, that is, the high gate voltage (VGH) returns to Vcc.

Apparently, the resistance value of the discharging path is greater than the resistance value of the charging path. Therefore, charging speed is faster than the discharging speed. Similarly, at the time points t2' and t4', and at the time points t2" and t4", the variation of high gate voltage (VGH) is same to the variation at the time points t2 and t4, and not be repeated here.

The relationship between the output enable signal OE generated by the timing controller 310 and the time control signal T1 can be known in FIG. 4B. At the time point t1, the output enable signal OE has a level transition; at the time point t2, the time control signal T1 has a level transition; at the time point t3, the output enable signal OE has a level return; at the time point t4, the time control signal T1 has a level return. Therefore, in an enable period (t1~t3t1'~t3't1"~t3") when the output enable signal OE is at the high level, the high gate voltage (VGH) is converted by the gate driver 340 to the gate pulses (G1, G2, G3).

In order to reduce the LCD screen flicker, it is known to use the gate pulse with a waveform including a cutting edge to reduce the feed through phenomenon. However, that gate pulse with a waveform including a cutting edge consumes more energy. The above technology is applied to the LCD panels having a half source driving (HSD) structure, energy consume is more serious because of doubling number of the gate.

SUMMARY OF THE INVENTION

Therefore, the present invention is to provide a gate pulse modulating circuit. The gate pulse modulating circuit comprises: a timing controller capable of generating an output enable signal and multiple time control signals; a high gate voltage generating unit electrically connected to timing controller and for receiving the time control signals, capable of generating a high gate voltage with a waveform including a plurality of cutting edges in response to the time control signals; a low gate voltage generating unit, capable of generating a low gate voltage; a gate driver, electrically connected to the timing controller for receiving the output enable signal, the high gate voltage generating unit for receiving the high gate voltage and the low gate voltage generating unit for receiving the low gate voltage, capable of generating a plurality of gate pulses in response to a plurality of enable periods of the output enable signal; wherein a waveform of the gate pulses includes a plurality of cutting edges.

The present invention also provides a gate pulse modulating method comprising steps of: generating an output enable signal, a first time control signal and a second time control signal by a timing controller; generating a high gate voltage varying among a maximum voltage, a first voltage, and a second voltage by a high gate voltage generating unit; and providing a gate driver capable of generating a gate pulse in response to the high gate voltage.

The present invention further provides a gate pulse modulating method comprising steps of: generating an output enable signal, a first time control signal, a second time control signal, a third time control signal and a fourth time control signal by a timing controller; generating a high gate voltage varying among a maximum voltage, a first voltage, a second voltage and a third voltage by a high gate voltage generating unit; and providing a gate driver capable of generating a gate pulse in response to the high gate voltage.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to an embodiment of the present invention, a gate pulse modulating circuit is provided to generate a high gate voltage (VGH) with a waveform including a plurality of cutting edges, and its gate driver can generate gate pulse with a waveform including a plurality of cutting edges in response to the high gate voltage (VGH).

Figure 1:
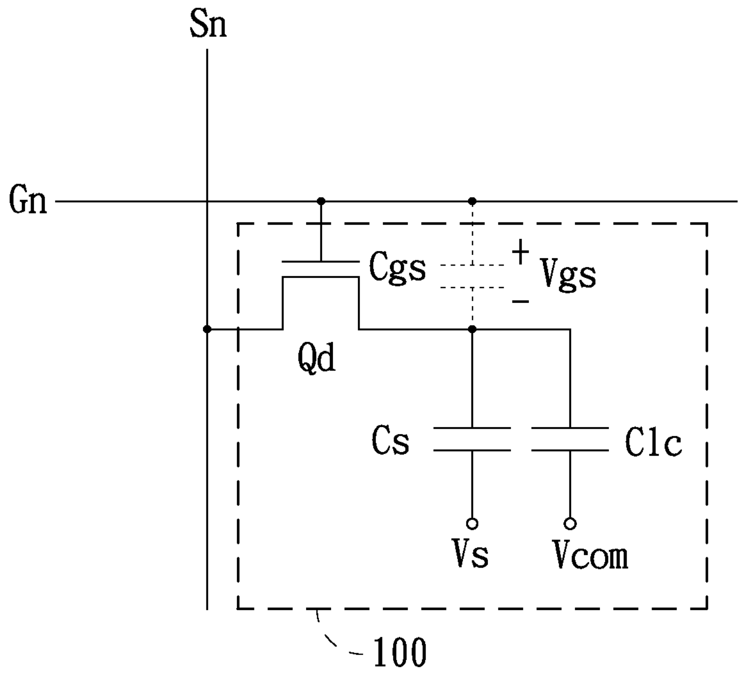
FIG. 1 (Prior Art)
FIG. 1 is a drawing schematically showing a pixel cell of a thin film transistor of a LCD panel (hereinafter referred to as LCD) in accordance with an existing technology.
Figure 2A:
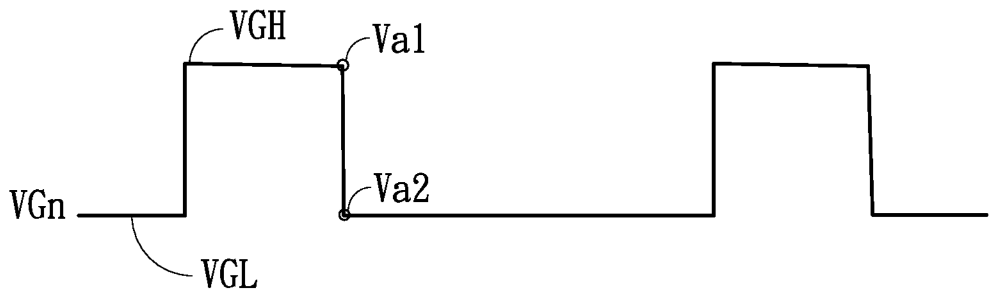
FIG. 2A (Prior Art)
FIG. 2A and FIG. 2B are schematic diagrams showing a variation of gate driving voltage on the gate line. What as shown in FIG. 2A is a gate pulse (VGn) having its waveform without cutting edge.
Figure 2B:
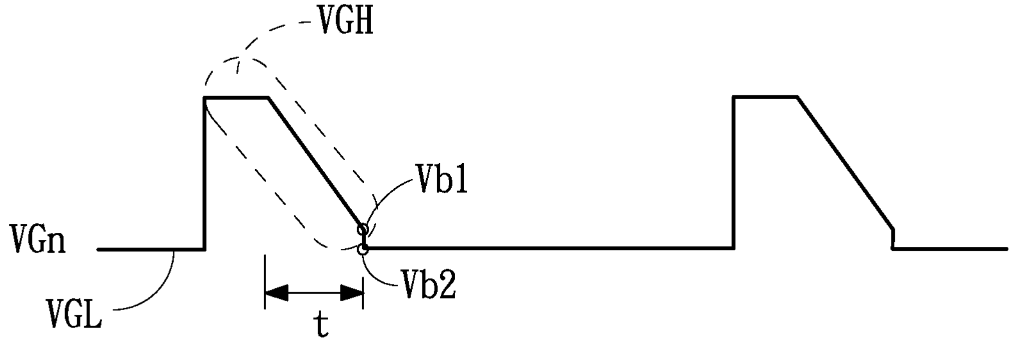
FIG. 2B (Prior Art)
Figure 3A:
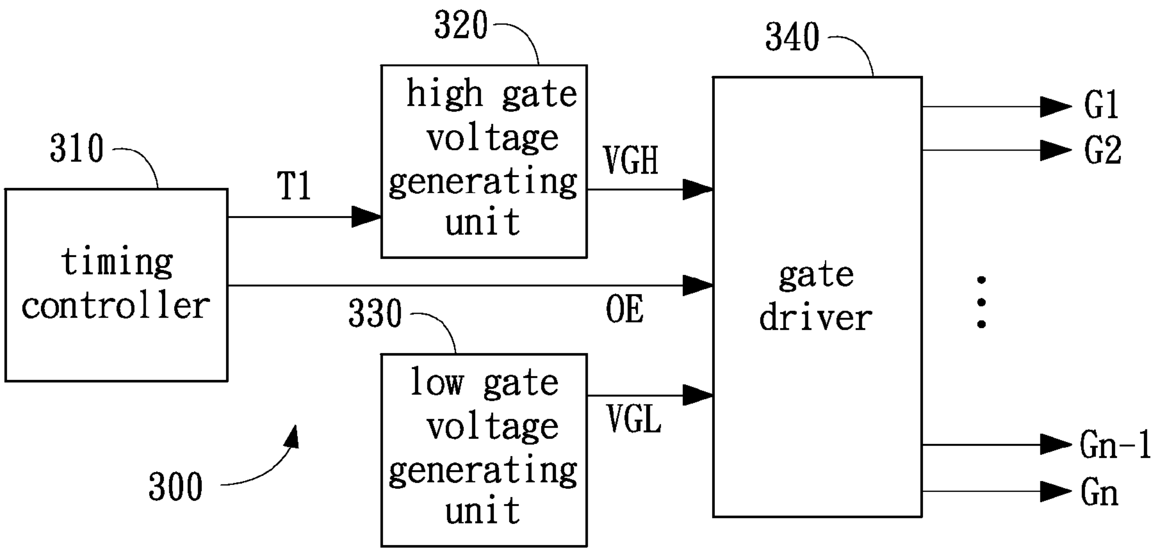
FIG. 3A (Prior Art)
FIG. 3A and FIG. 3B are schematic diagrams showing a gate pulse modulating circuit and associated signals thereof, in accordance with an existing technology.
Figure 3B:
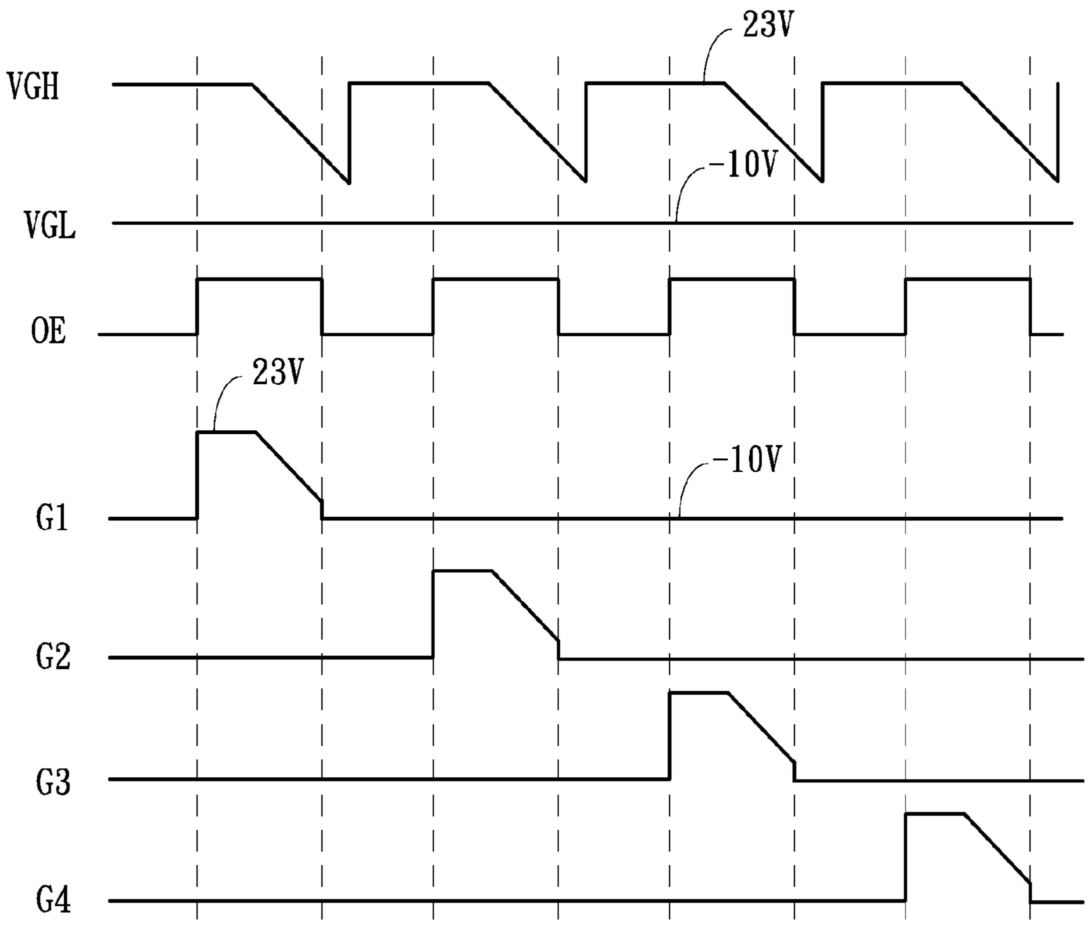
FIG. 3B (Prior Art)
Figure 4A:
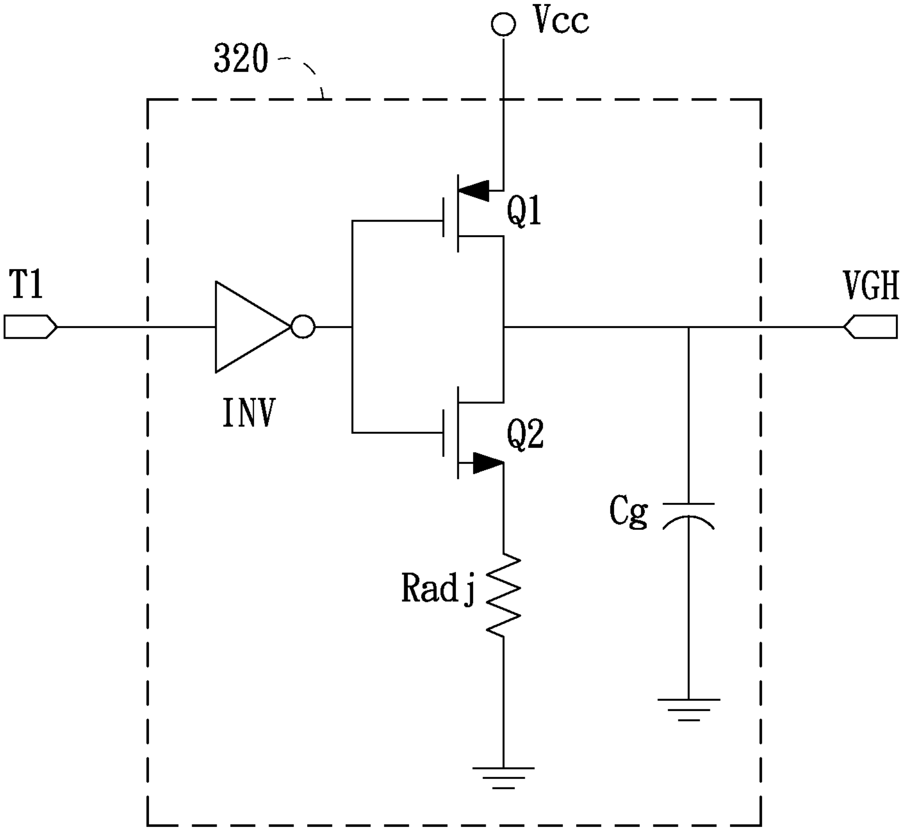
FIG. 4A (Prior Art)
FIG. 4A and FIG. 4B are schematic diagrams showing a high gate voltage generating unit and signals of a gate pulse modulating circuit, in accordance with an existing technology.
Figure 4B:
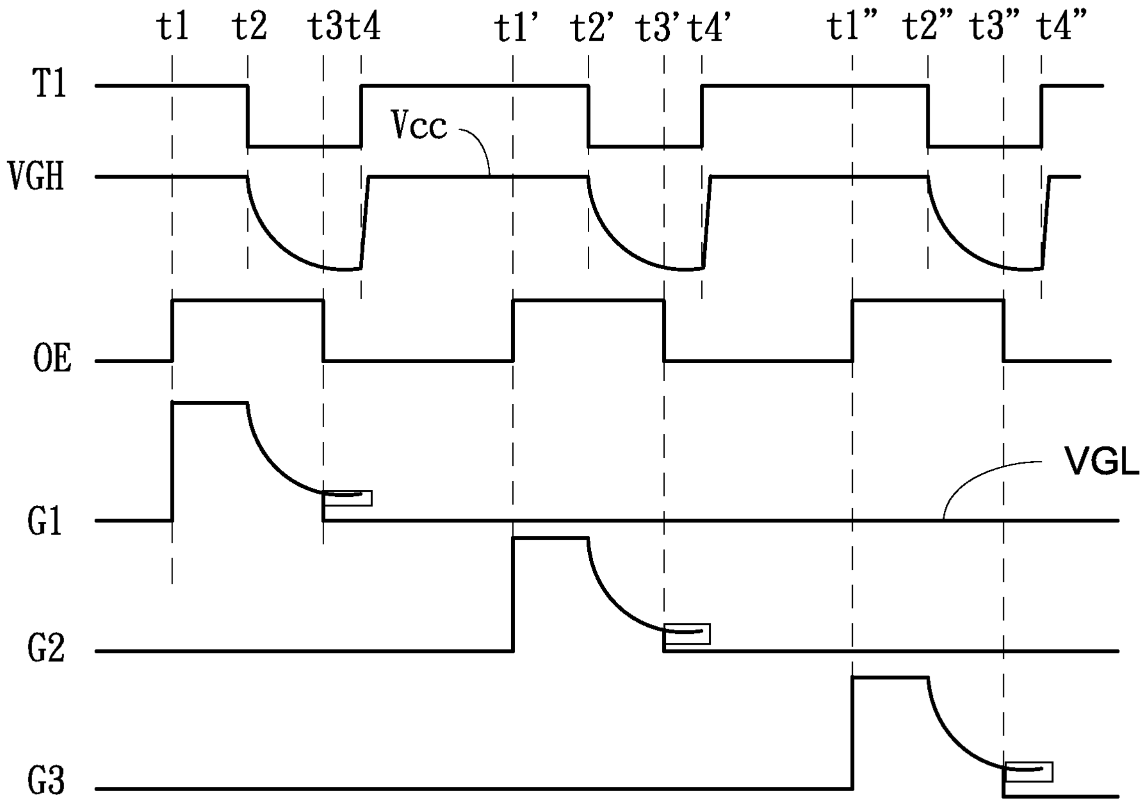
FIG. 4B (Prior Art)
Figure 5:
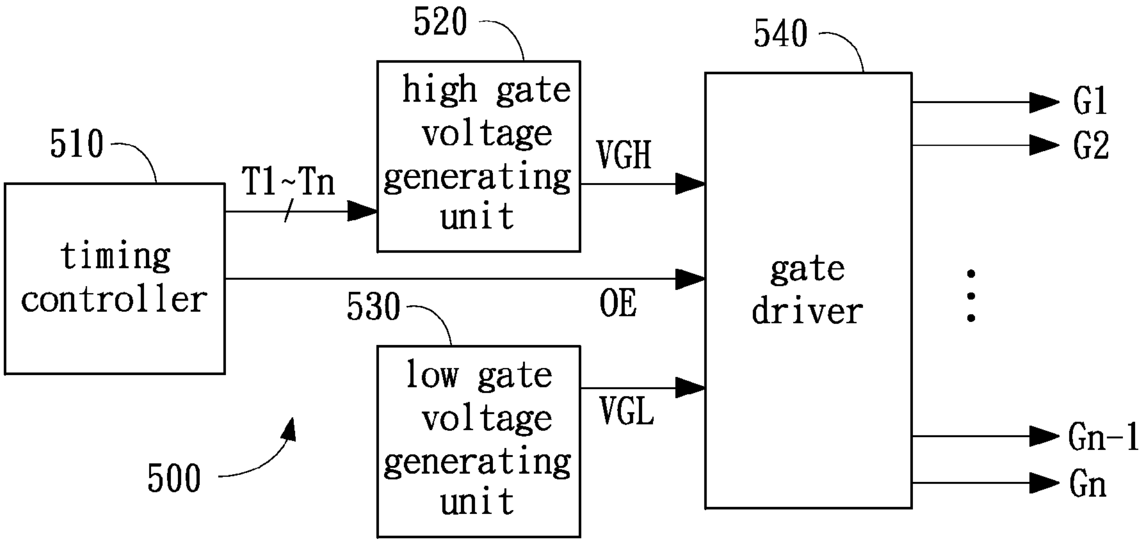
FIG. 5 is a schematic diagram showing a gate pulse modulating circuit in accordance with a first embodiment of the present invention.

Please referring to FIG. 5, it is a diagram showing a gate pulse modulating circuit in accordance with a first embodiment of the present invention. The gate pulse modulating circuit 500 comprises a timing controller 510, a high gate voltage generating unit 520, a low gate voltage generator unit 530 and a gate driver 540.

In the embodiment of the present invention, in order to obtain the gate high voltage (VGH) with a waveform including a plurality of cutting edges, the timing controller 510 outputs a plurality of time control signals T1~Tn to the high gate voltage generating unit 520, enabling the high gate voltage generating unit 520 to output a high gate voltage (VGH) with a waveform including a plurality of cutting edges. Furthermore, the low gate voltage generating unit 530 outputs a low gate voltage (VGL). The gate driver 540 receives the output enable signal (OE) from the timing controller 510, the high gate voltage (VGH), the low gate voltage (VGL), and generates multiple gate pulses (G1~Gn) to the corresponding gate lines.

(OE) from the timing controller 510, the high gate voltage (VGH), the low gate voltage (VGL), and generates multiple gate pulses (G1~Gn) to the corresponding gate lines.

To illustrate easily, in the first embodiment, it is described below only how two time-controlling signals T1 and T2 are used to obtain a high gate voltage (VGH) with a waveform including two cutting edges. The persons in this technology can provide easily without any creative work that more than two time control signals T1~Tn are used to obtain a high gate voltage (VGH) with a waveform including n cutting edges, according to the following description.

Figure 6A:
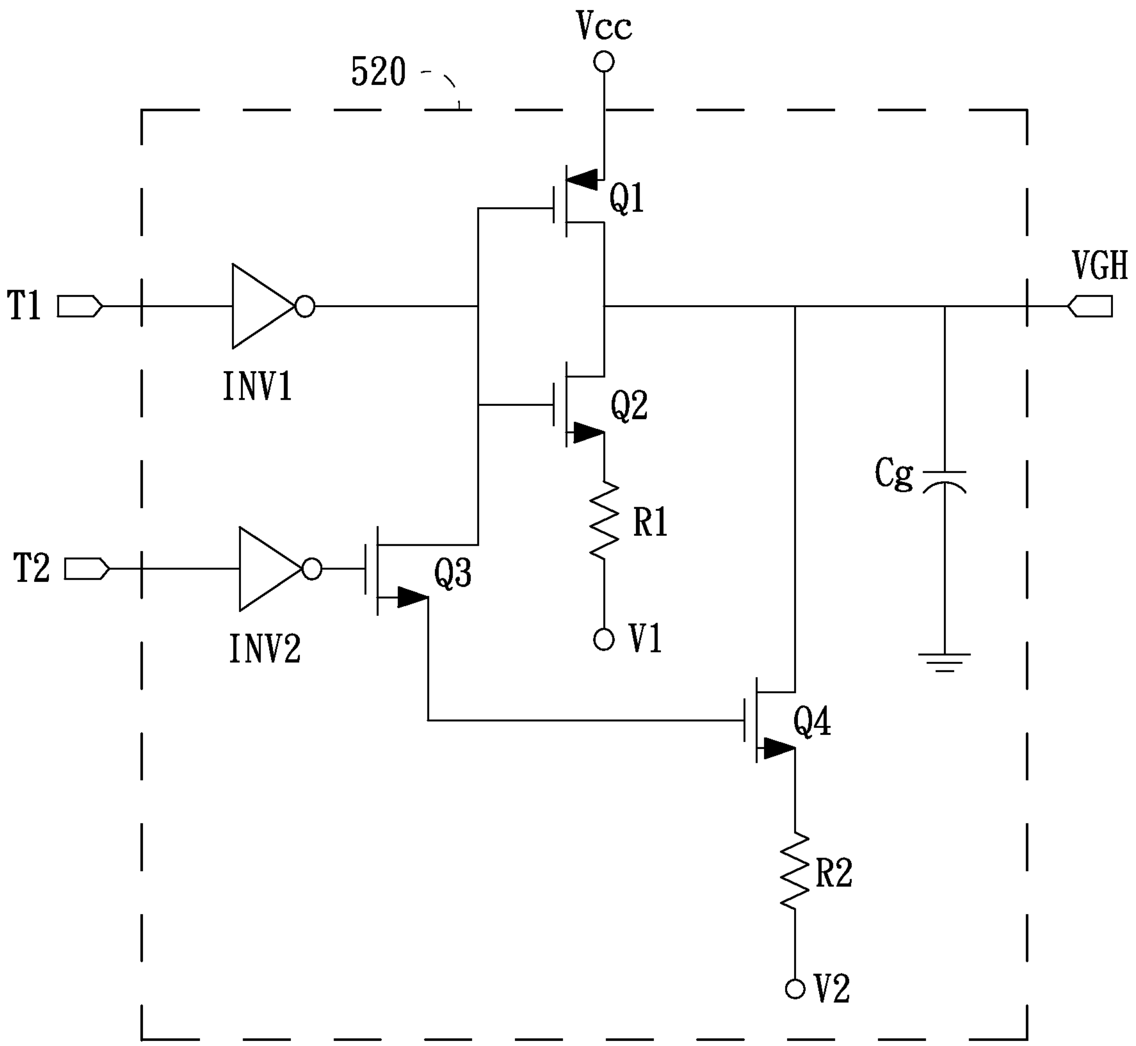
FIG. 6A and FIG. 6B are schematic diagrams showing a high gate voltage generating unit and signals of a gate pulse modulating circuit, in accordance with the first embodiment of the present invention.
Figure 6B:
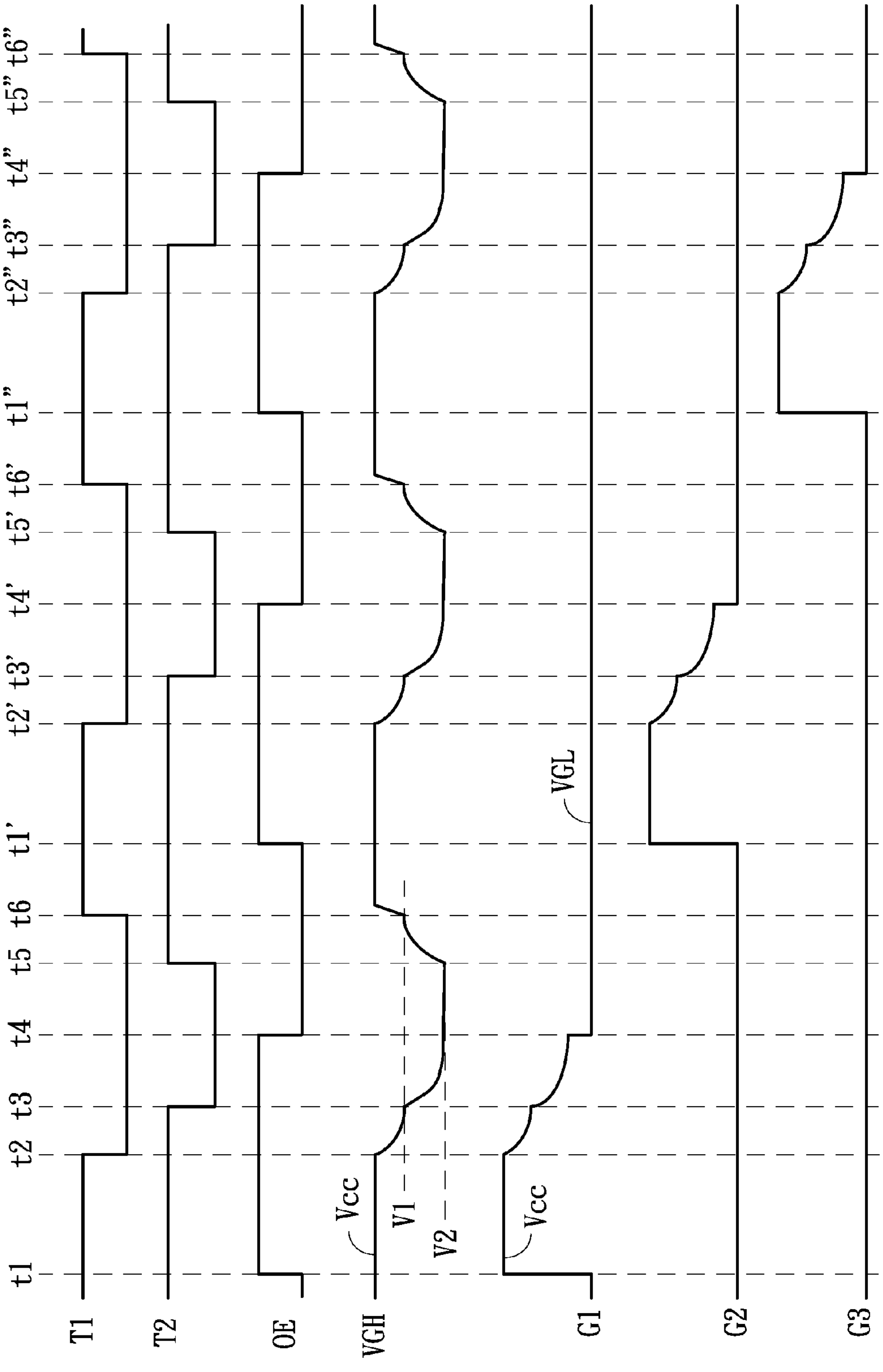

Please refer to FIG. 6A and FIG. 6B, they are diagrams showing a high gate voltage generating unit and signals of a gate pulse modulating circuit, in accordance with the first embodiment of the present invention. The high gate voltage generating unit 520 comprises a first inverter INV1, a second inverter INV2, a first transistor Q1, a second transistor Q2, a third transistor Q3, a fourth transistor Q4, a first resistor R1, a second resistor R2, and a capacitor Cg. Among them, the first transistor Q1 is P-type transistor, and the other transistors Q2~Q4 are N-type transistors.

The input of the first inverter INV1 receives the first time control signal T1, and the output of the first inverter INV1 is connected to the gates of the first and second transistors Q1 and Q2. The source of the first transistor Q1 is connected to a maximum voltage (Vcc), the drain of the first transistor Q1 is connected to the drain of the second transistor Q2, the first resister R1 is connected between the source of the second transistor Q2 and a first voltage (V1). The capacitor Cg is connected between the drain of the first transistor Q1 and the ground, and the drain of the first transistor Q1 is a high gate voltage (VGH) output and produces the high gate voltage (VGH).

The input of the second inverter INV2 receives the second time control signal T2, the output of the second inverter INV2 is connected to the gate of the third transistor Q3. The gate of the third transistor Q3 is connected to the output of the first inverter INV1, the source of the third transistor Q3 is connected to the gate of the fourth gate transistor Q4. The drain of the fourth transistor Q4 is connected to the high gate voltage (VGH) output, a second resistor R2 is connected between the source of the fourth transistor Q4 and a second voltage (V2).

The maximum voltage (Vcc) is greater than the first voltage (V1), and the first voltage (V1) is greater than the second voltage (V2).

It is known from FIG. 6B that the signal during the cycle t1~t1' is repeated periodically during other cycles. Therefore, only the situation during the cycle t1'~t1" is described as an example, and the situation during the cycle t1~t1' is omitted because it is the same as the situation during the cycle t1~t1'. During the cycle t1~t1', the enable signal OE has a level transition (from a low level to a high level) at the time point t1, the first time control signal T1 has a level transition (from a high level to a low level) at the time point t2, the second time control signal T2 has a level transition (from a high level to a low level) at the time point t3, the output enable signal OE has a level return (from the high level to the low level) at the time point t4, the second time control signal T2 has a level return (from the low level to the high level) at the time point t5, and the first time control signal T1 has a level return (from the low level to the high level) at the time point t6.

Before the time point t1, the first and second time control signals T1 and T2 are all at the high level, therefore, the first transistor Q1 is turned on and the other transistors Q2~Q4 are turned off, the capacitor Cg (Vcc) is charged to the maximum voltage (Vcc), enabling the output of the high gate voltage to produce the maximum voltage (Vcc). The gate pulse before the time point t1 has a low gate voltage (VGL).

Between the time point t1 and the time point t2, the first and second time control signals T1 and T2 are maintained at the high level and the output enable signal OE is at the high level, so the first gate pulse (G1) is generated and has the maximum voltage (Vcc).

Between the time point t2 and the time point t3, the first controlling signal T1 has a level transition to the lower level, the second time control signal T2 and the output enable signal OE are maintained at the high level, with the first transistor Q1 turned off, the first second transistor Q2 turned on, the third transistor Q3 and the fourth transistor Q4 turned off. Therefore, the second transistor Q2 and the first resistor R1 generate a first discharging path, enabling the voltage on the capacitor Cg to drop from the maximum voltage (Vcc) to the first voltage (V1); that is, the voltage on the high gate voltage (VGH) output drops from the maximum voltage output (Vcc) to the first voltage (V1). In other words, between the time point t2 and the time point t3, the first gate pulse (G1) also changes from the maximum voltage (Vcc) down to the first voltage (V1).

Between the time point t3 and the time point t4, the second time control signal T2 has a level transition to the low level, the first time control signal T1 is maintained at the low level, and the output enable signal OE is maintained at the high level, with the first transistor Q1 turned off, the second transistor Q2 turned on, the third transistor Q3 turned on, and the fourth transistor Q4 turned on. Therefore, the fourth transistor Q4 and the second resistor R2 generate a second discharging path, enabling the voltage on the capacitor Cg to drop from the first voltage (V1) to the second voltage (V2); that is, the voltage on the high gate voltage (VGH) output drops from the first voltage (V1) to second voltage (V2). In other words, between the time point t3 and the time point t4, the first gate pulse (G1) also changes from the first voltage (V1) down to the second voltage (V2).

Between the time point t4 and the time point t5, the first time control signals T1 and the second time control signal T2 are maintained at the low level, and the output enable signal OE returns to the low level, enabling the first transistor Q1 turned off, the second transistor Q2 turned on, the third transistor Q3 turned on, and the fourth transistor Q4 turned on. At this point, the first gate pulse (G1) drops from the first voltage (V1) to the lower gate voltage (VGL).

Between the time point t5 and the time point t6, the second time control signal T2 returns to the high level, the first time control signal T1 is maintained at the low level, and the output enable signal OE is maintained at the low level, enabling the first transistor Q1 turned off, the second transistor Q2 turned on, the third transistor Q3 turn off, and the fourth transistor Q4 turned off. At this point, the second transistor Q2 and the first resistor R1 generate a first charging path, enabling the voltage on the capacitor Cg to rise from the second voltage (V2) to the first voltage (V1); that is, the voltage on the high gate voltage (VGH) output rises from the second voltage (V2) to the first voltage (V1). Since at this time the output enable signal OE is maintained at the low level, the first gate pulse (G1) is still maintained at the low gate voltage (VGL).

Between the time point t6 and the time point t1', the first time control signal T1 returns to the high level, the second time control signal T2 is maintained at the high level, and the output enable signal OE is maintained at the low level, enabling the first transistor Q1 turned off, the second transistor Q2 turned off, the third transistor Q3 turned off, the fourth transistor Q4 turned off. At this time, the first transistor Q1 generates a second charging path, enabling the voltage on the capacitor Cg to rise from the first voltage (V1) to the highest voltage (Vcc); that is, the high gate voltage (VGH) output rises from the first voltage (V1) to the highest voltage (Vcc). Since the output enable signal OE is still maintained at the low level, the first gate pulse (G1) is also maintained at the low gate voltage (VGL).

Similarly, the time point t1' to the time point t1" is another time period, for enabling the gate drive 540 to produce a second gate pulse (G2). While, generation of the other gate pulses is no longer repeated due to the same situation as that of the first gate pulse (G1).

According to the first embodiment of the invention, the high gate voltage generating unit 520 provides the first voltage (V1) and the second voltage (V2), enabling voltage drop of the gate pulse to be divided into two stages and the gate pulse to having a waveform with two cutting edges. Since the voltage difference at each stage is small, the feed-through phenomenon can be effectively reduced.

Furthermore, as shown in FIG. 6B, between at time point t2 and the time point t3, the charge released at the first discharging path can be re-used between the time point t5 and the time point t6, by means of the first charging path and stored in the capacitor Cgs. Therefore, it can also decrease energy consumption.

Figure 7A:
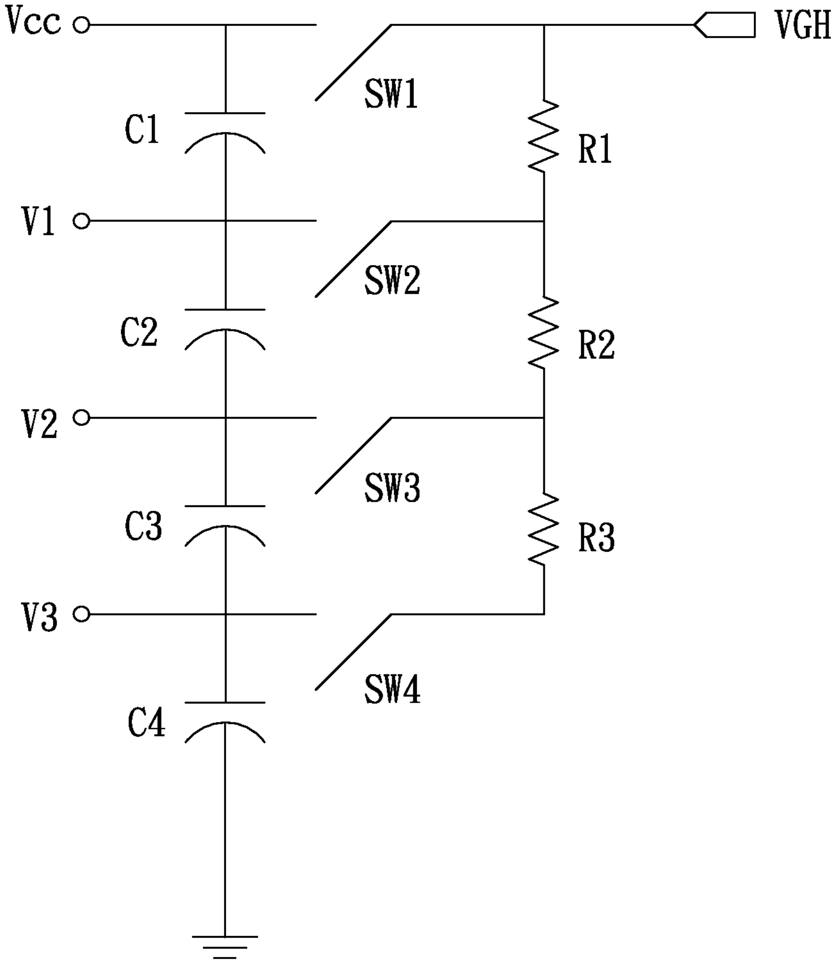
FIG. 7A and FIG. 7B are schematic diagrams showing a high gate voltage generating unit and signals of a gate pulse modulating circuit, in accordance with a second embodiment of the present invention.
Figure 7B:
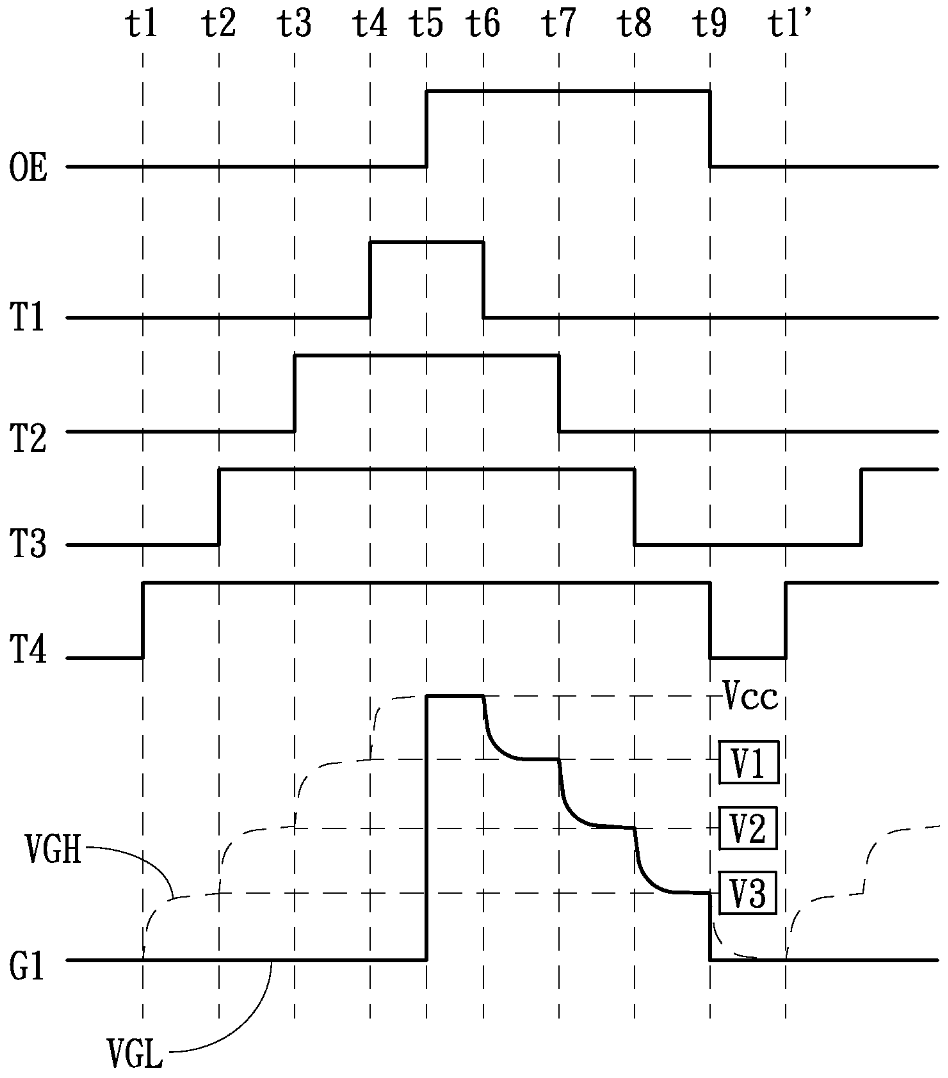

Please refer to FIG. 7A and FIG. 7B, they are diagrams showing a high gate voltage generating unit and signals of a gate pulse modulating circuit, in accordance with a second embodiment of the present invention. As an example, FIG. 7 illustrates a high gate voltage with a waveform including three cutting edges. The high gate voltage generating unit includes a first capacitor C1, a second capacitor C2, a third capacitor C3, a fourth capacitor C4, a first switching unit SW1, a second switching unit SW2, a third switching unit SW3, a fourth switching unit SW4, a first resistor R1, a second resistor R2, and a third resistor R3. Here, the maximum voltage (Vcc) is greater than the first voltage (V1), the first voltage (V1) is greater than the second voltage (V2), and the second voltage (V2) is greater than the third voltage (V3).

A first end of the first capacitor C1 receives the maximum voltage (Vcc), and a second end of the first capacitor C1 receives the first voltage (V1); a first end of the second capacitor C2 receives the first voltage (V1), and a second end of the second capacitor C2 receives the second voltage (V2); a first end of the third capacitor C3 receives the second voltage (V2), and a second end of the third capacitor C3 receives the third voltage (V3); a first end of the fourth capacitor C4 receives the third voltage (V3), and the second end of the fourth capacitor C4 receives a grounding voltage.

A first end of the first resistor R1 is connected to high gate voltage (VGH) output, and a second end of the first resistor R1 is connected to a first end of the second resistor R2, a second end of the second resistor R2 is connected to a first end of the third resistor R3.

The first switching unit SW1 is connected between the first end of the first capacitor C1 and with the first end of the first resistor R1; the second switching unit SW2 is connected between the first end of the second capacitor C2 and the first end of the second resistor R2; the third switching unit SW3 is connected between the first end of the third capacitor C3 and the first end of the third resistor R3; and the fourth switching unit SW4 is connected between the first end of the fourth capacitor C4 and the second end of the third resistor R3.

It is known from FIG. 7B that the signal during the cycle t1~t1' is repeated periodically during other cycles. Therefore, only the situation during the cycle t1~t1' is described as an example. During the cycle t1~t1', the fourth time control signal T4 has a level transition at the time point t1, the third time control signal Ts has a level transition at the time point t2, the second time control signal T2 has a level transition at the time point t3, the first time control signal T1 has a level transition at the time point t4. The output enable signal OE has a level transition at the time point t5, the first time control signal T1 has a level return at the time point t6, the second time control signal T2 has a level return at the time point t7, the third time control signal T3 has a level return at the time point t8, the fourth time control signal T4 and the output enable signal OE have a level return respectively at the time point t9.

According to the second embodiment of the invention, the switching units SW1~SW4 are controlled by the time control signals T1~T4. When the time control signals T1~T4 are at the high level, the corresponding switching units SW1~SW4 are at a close state. When the time control signals T1~T4 are at the low level, the corresponding switching units SW1~SW4 are at an open state.

Between the time point t1 and the time point t2, the fourth switching unit SW4 is at the close state, the high gate voltage (VGH) output as shown by a dotted line can be charged to the third voltage (V3), but the output enable signal OE is at the low level so that the gate pulse as shown by a solid line has a low gate voltage (VGL).

Between the time point t2 and the time point t3, the third switching unit SW3 is at the close state, the high gate voltage (VGH) output as shown by a dotted line can be charged to the second voltage (V2), but the output enable signal OE is at the low level so that the gate pulse as shown by a solid line has a low gate voltage (VGL).

Between the time point t3 and the time point t4, the second switching unit SW2 is at the close state, the high gate voltage (VGH) output as shown by a dotted line can be charged to the first voltage (V1), but the output enable signal OE is at the low level so that the gate pulse as shown by a solid line has a low gate voltage (VGL).

Between the time point t4 and the time point t5, the first switching unit SW1 is at the close state, the high gate voltage (VGH) output as shown by a dotted line can be charged to the maximum voltage (Vcc), but the output enable signal OE is at the low level so that the gate pulse as shown by a solid line has a low gate voltage (VGL).

Between the time point t5 and the time point t6, the first switching unit SW1 is at the close state, the high gate voltage (VGH) output as shown by a dotted line can be charged to the maximum voltage (Vcc), and the output enable signal OE is at the high level so that the gate pulse as shown by a solid line has the maximum voltage (Vcc).

Between the time point t6 and the time point t7, the first switching unit SW1 is at the open state, the high gate voltage (VGH) output is discharged to the first voltage (V1), and the output enable signal OE is at the high level so that the gate pulse is reduced to the first voltage (V1).

Between the time point t7 and the time point t8, the second switching unit SW2 is at the open state, the high gate voltage (VGH) output is discharged to the second voltage (V2), and the output enable signal OE is at the high level so that the gate pulse is reduced to the second voltage (V2).

Between the time point t8 and the time point t9, the third switching unit SW3 is at the open state, the high gate voltage (VGH) output is discharged to the third voltage (V3), and the output enable signal OE is at the high level so that the gate pulse is reduced to the third voltage (V3).

Between the time point t9 and the time point t10, the fourth switching unit SW4 is at the open state, the high gate voltage (VGH) output as shown by the dotted line is discharged to the ground voltage, and the output enable signal OE is at the low level so that the gate pulse is reduced to the low gate voltage (VGL).

According to the second embodiment of the invention, the high gate voltage generating unit provides multiple voltages, enabling voltage drop of the gate pulse to be divided into multiple stage. Since the voltage difference at each stage is small, the feed-through phenomenon can be effectively reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gate pulse modulating circuit, comprising:

a timing controller, generating an output enable signal and multiple time control signals;

a high gate voltage generating unit, electrically connected to timing controller and for receiving the time control signals, and generating a high gate voltage with a waveform including a plurality of cutting edges in response to the time control signals;

a low gate voltage generating unit, generating a low gate voltage; and a gate driver, electrically connected to the timing controller for receiving the output enable signal, the high gate voltage generating unit for receiving the high gate voltage and the low gate voltage generating unit for receiving the low gate voltage, and generating a plurality of gate pulses in response to a plurality of enable periods of the output enable signal;

wherein a waveform of the gate pulses includes a plurality of cutting edges;

wherein the time control signals comprise a first time control signal and a second time control signal, and the high gate voltage generating unit comprises:

a first inverter, having an input to receive the first time control signal;

a first transistor, having a gate electrically connected to an output of the first inverter, a source to receive a maximum voltage, and a drain connected to a high gate voltage output;

a second transistor, having a gate electrically connected to the output of the first inverter, and a drain connected to the high gate voltage output;

a first resistor, connected between a source of the second transistor of and a first voltage;

a second inverter, having an input to receive the second time control signal;

a third transistor, having a gate electrically connected to an output of the second inverter output and a drain connected to the output of the first inverter;

a fourth transistor, having a gate electrically connected to a source of the third transistor, and a drain connected to the high gate voltage output; and a second resistor, connected between a source of the fourth transistor and a second voltage; and wherein the maximum voltage is greater than the first voltage, and the first voltage is greater than the second voltage.

2. The gate pulse modulating circuit according to claim 1, wherein a level transition relationship of the output enable signal, the first time control signal and the second time control signal is: the output enable signal has a level transition at a time point t1, the first time control signal has a level transition at a time point t2, the second time control signal has a level transition at a time point t3, the output enable signal has a level return at a time point t4, the second time control signal has a level return at a time point t5, and the first time control signal has a level return at a time point t6.

3. A gate pulse modulating circuit, comprising:

a timing controller, generating an output enable signal and multiple time control signals;

a high gate voltage generating unit, electrically connected to timing controller and for receiving the time control signals, and generating a high gate voltage with a waveform including a plurality of cutting edges in response to the time control signals;

a low gate voltage generating unit, generating a low gate voltage; and a gate driver, electrically connected to the timing controller for receiving the output enable signal, the high gate voltage generating unit for receiving the high gate voltage and the low gate voltage generating unit for receiving the low gate voltage, and generating a plurality of gate pulses in response to a plurality of enable periods of the output enable signal;

wherein a waveform of the gate pulses includes a plurality of cutting edges;

wherein the time control signal comprises a first time control signal, a second time control signal, a third time control signal and a fourth time control signal, and the high gate voltage generating unit comprises:

a first capacitor, having a first end to receive a maximum voltage and a second end capable of a first voltage;

a second capacitor, having a first end capable of receiving a maximum voltage and a second end to receive a second voltage;

a third capacitor, having a first end to receive the second voltage and a second end to receive a third voltage;

a fourth capacitor, having a first end to receive the third voltage and a second end to receive a ground voltage;

a first resistor, having a first end connected to a high gate voltage output;

a second resistor, having a first end connected to a second end of the first resistor;

a third resistor, having a first end connected to a second end of the second resistor;

a first switching unit, connected between the first end of the first capacitor and the first end of the first resistor;

a second switching unit, connected between the first end of the second capacitor and the first end of the second resistor;

a third switching unit, connected between the first end of the third capacitor and the first end of the third resistor; and a fourth switching unit, connected between the first end of the fourth capacitor and the second end of the third resistor;

wherein the first switching unit is controlled by the first time control signal, the second switching unit is controlled by the second time control signal, the third switching unit is controlled by the third time control signal and the fourth switching unit is controlled by the fourth time control signal, the maximum voltage is greater than the first voltage, the first voltage is greater than the second voltage, and the second voltage is greater than the third voltage.

4. The gate pulse modulating circuit according to claim 3, wherein a level transition relationship of the output enable signal, the first time control signal, the second time control signal, the third time control signal and the fourth time control signal is: the fourth time control signal has a level transition at a time point t1, the third time control signal has a level transition at a time point t2, the second time control signal has a level transition at a time point t3, the first time control signal has a level transition at a time point t4, the output enable signal has a level transition at a time point t5, the first time control signal has a level return at a time point t6, the second time control signal has a level return at a time point t7, the third time control signal has a level return at a time point t8, and the fourth time control signal and the output enable signal have a level return respectively at a time point t9.

5. A gate pulse modulating method, comprising steps of:

generating an output enable signal, a first time control signal and a second time control signal by a timing controller;

generating a high gate voltage varying among a maximum voltage, a first voltage, and a second voltage by a high gate voltage generating unit; and providing a gate driver capable of generating a gate pulse in response to the high gate voltage;

wherein a level transition relationship of the output enable signal, the first time control signal and the second time control signal is: the output enable signal has a level transition at a time point t1, the first time control signal has a level transition at a time point t2, the second time control signal has a level transition at a time point t3, the output enable signal has a level return at a time point t4, the second time control signal has a level return at a time point t5, and the first time control signal has a level return at a time point t6;

wherein the high gate voltage is maintained at the high level between the time point t1 and the time point t2; the high gate voltage drops from the maximum voltage to the first voltage between the time point t2 and the time point t3; the high gate voltage drops from the first voltage to the second voltage between the time point t3 and the time point t5; the high gate voltage rises from the second voltage to the first voltage between the time point t5 and the time point t6; and the high gate voltage rises from the first voltage to the maximum voltage after the time point t6.

6. The gate pulse modulating method according to claim 5, wherein the gate driver generates the gate pulse in response to the high gate voltage between the time point t1 and the time point t4.

7. A gate pulse modulating method, comprising steps of:

generating an output enable signal, a first time control signal, a second time control signal, a third time control signal and a fourth time control signal by a timing controller;

generating a high gate voltage varying among a maximum voltage, a first voltage, a second voltage and a third voltage by a high gate voltage generating unit; and providing a gate driver to generate a gate pulse in response to the high gate voltage;

wherein a level transition relationship of the output enable signal, the first time control signal, the second time control signal, a third time control signal and the fourth time control signal is: the fourth time control signal has a level transition at a time point t1, the third time control signal has a level transition at a time point t2, the second time control signal has a level transition at a time point t3, the first time control signal has a level transition at a time point t4, the output enable signal has a level transition at a time point t5, the first time control signal has a level return at a time point 6, the second time control signal has a level return at a time point t7, the third time control signal has a level return at a time point t8, and the fourth time control signal and the output enable signal have a level return respectively at a time point t9.

8. The gate pulse modulating method according to claim 7, wherein the high gate voltage is charged to the third voltage between the time point t1 and the time point t2; the high gate voltage rises from the third voltage to the second voltage between the time point t2 and the time point t3; the high gate voltage rises from the second voltage to the first voltage between the time point t3 and the time point t4; and the high gate voltage rises from the first voltage to the maximum voltage between the time point t4 and the time point t6.

9. The gate pulse modulating method according to claim 7, wherein the high gate voltage drops from the maximum voltage to the first voltage between the time point t6 and the time point t7; the high gate voltage drops from the first voltage to the second voltage between the time point t7 and the time point t8; the high gate voltage drops from the second voltage to the third voltage between the time point t8 and the time point t9; and the high gate voltage is discharged from the third voltage after the time point t9.

10. The gate pulse modulating method according to claim 7, wherein the gate driver generates the gate pulse in response to the high gate voltage between the time point t5 and the time point t9.

11. The gate pulse modulating method according to claim 7, wherein the level transitions of the enable output signal, the first time control signal, the second time control signal, the third time control signal and the fourth time control signal are from a low level to a high level; and the level returns of the enable output signal, the first time control signal, the second time control signal, the third time control signal and the fourth time control signal are from a high level to a low level.

* * * * *